(12) United States Patent
Borretti et al.

(10) Patent No.: US 12,311,773 B2
(45) Date of Patent: May 27, 2025

(54) METHODS AND SYSTEMS FOR ENSURING COMPLIANCE OF AN ELECTRIC VEHICLE

(71) Applicant: Dana Motion Systems Italia S.R.L., Reggio Emilia (IT)

(72) Inventors: Biagio Borretti, Modena (IT); Alessandro Benevelli, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 484 days.

(21) Appl. No.: 17/645,281

(22) Filed: Dec. 20, 2021

(65) Prior Publication Data

US 2023/0191917 A1    Jun. 22, 2023

(51) Int. Cl.
| | | |
|---|---|---|
| *B60L 15/10* | (2006.01) | |
| *B60L 50/51* | (2019.01) | |
| *B60W 20/20* | (2016.01) | |
| *B60W 20/30* | (2016.01) | |

(52) U.S. Cl.
CPC ............... *B60L 15/10* (2013.01); *B60L 50/51* (2019.02); *B60W 20/20* (2013.01); *B60W 20/30* (2013.01); *B60L 2240/421* (2013.01); *B60L 2240/527* (2013.01)

(58) Field of Classification Search
None
See application file for complete search history.

(56) References Cited

U.S. PATENT DOCUMENTS

| | | | |
|---|---|---|---|
| 7,110,869 B2 | 9/2006 | Tao et al. | |
| 8,452,473 B2 | 5/2013 | Ganley et al. | |
| 9,096,135 B1* | 8/2015 | Simonini | B60L 53/32 |
| 9,127,667 B2 | 9/2015 | Lee et al. | |
| 9,707,957 B2 | 7/2017 | Shimizu et al. | |
| 2004/0124023 A1* | 7/2004 | Plishner | B60K 6/46 |
| | | | 180/170 |
| 2009/0076679 A1* | 3/2009 | Martini | F16H 61/12 |
| | | | 701/51 |
| 2012/0197506 A1* | 8/2012 | Reynolds | B60T 8/17636 |
| | | | 701/84 |
| 2012/0239236 A1* | 9/2012 | Eom | B60L 50/60 |
| | | | 701/22 |

(Continued)

FOREIGN PATENT DOCUMENTS

CN  107264518 B  7/2021

*Primary Examiner* — James J Lee
*Assistant Examiner* — Melanie G Huber
(74) *Attorney, Agent, or Firm* — McCoy Russell LLP

(57) ABSTRACT

Methods and systems are disclosed for customizing an advanced driver assistance system (ADAS) of a vehicle. In one example, a system for an electric vehicle comprises a current sensor arranged on a power line coupling a battery of the electric vehicle with an inverter of the electric vehicle; a directional speed sensor arranged at a motor of the electric vehicle; and a high voltage direct current contactor arranged on the power line coupling the battery of the electric vehicle with the inverter, upstream of the current sensor, the high voltage direct current contactor configured to allow a current to flow from the battery to the inverter when the high voltage direct current contactor is in a closed position, and to not allow the current to flow when the high voltage direct current contactor is in an open position.

16 Claims, 4 Drawing Sheets

(56) References Cited

U.S. PATENT DOCUMENTS

| | | | |
|---|---|---|---|
| 2013/0332030 A1* | 12/2013 | Koukes | B60W 10/20 |
| | | | 701/41 |
| 2014/0062348 A1* | 3/2014 | Isayeva | G05B 9/03 |
| | | | 318/139 |
| 2015/0088351 A1* | 3/2015 | Meeks | B60W 20/00 |
| | | | 701/99 |
| 2018/0056811 A1* | 3/2018 | Iwahana | H02P 23/30 |
| 2020/0317059 A1* | 10/2020 | Mikami | B60K 6/24 |
| 2021/0171015 A1* | 6/2021 | Artail | B60K 6/445 |
| 2023/0166751 A1* | 6/2023 | Bower | B60W 20/10 |
| | | | 701/22 |

* cited by examiner

METHODS AND SYSTEMS FOR ENSURING COMPLIANCE OF AN ELECTRIC VEHICLE

TECHNICAL FIELD

The present disclosure relates generally to electric vehicles, and more specifically, to compliance of components of electric traction systems.

BACKGROUND AND SUMMARY

Traction systems of vehicles need to be compliant for various off-highway applications, following standards such as EN 1175, ISO 25119, ISO 19014, and ISO 13849. Compliance may be relatively easy to achieve for traction systems based on internal combustion engines, which include components designed to meet the above standards. However, traction systems are moving towards electrification, and electric traction systems may be built using off-the-shelf components such as inverters and motors that are not certified as being compliant with the above standards. Because compliance is required by manufacturers, off-the-shelf inverters and motors may not be installed in a vehicle, because the certification of the vehicle may not be possible if at least one element in a critical path of an electric traction system is not certified. As a result of not being able to use off-the-shelf inverters and motors in electric traction systems, a cost and a time of designing and developing the electric traction systems may be increased, and a flexibility in the design of electric traction systems may be decreased. Additionally, electric vehicle design may not take advantage of innovations developed in off-the-shelf components that might increase an efficiency of electric vehicles.

To address at least a portion of the abovementioned issues, the inventors have developed a system for an electric vehicle, the system comprising a current sensor arranged on a power line coupling a battery of the electric vehicle with an inverter of the electric vehicle; a directional speed sensor arranged at a motor of the electric vehicle; and a high voltage direct current contactor arranged on the power line coupling the battery of the electric vehicle with the inverter, upstream of the current sensor, the high voltage direct current contactor configured to allow a current to flow from the battery to the inverter when the high voltage direct current contactor is in a closed position, and to not allow the current to flow when the high voltage direct current contactor is in an open position.

Using the system, one or more plausibility checks may be performed to determine whether any discrepancies exist between an operator input and a response of the vehicle. The one or more plausibility checks may include a plausibility check between a direction of movement requested by a driver of the vehicle and a direction of movement detected by the directional speed sensor; a plausibility check between a speed requested by the driver of the vehicle and a speed measured by the directional speed sensor; a plausibility check between a torque requested by the driver of the vehicle and a torque threshold; and a plausibility check between an acceleration of the vehicle estimated via the directional speed sensor data and the current sensor data and a pre-determined threshold (e.g., maximum) acceleration. If a discrepancy between an operator input and a response of the vehicle is detected as a result of the plausibility checks, torque to the wheels of the vehicle may be cut off by activating the high voltage direct current contactor.

By cutting off the power supplied to the electric motor, a torque applied to the wheels of the vehicle may be reduced to zero, with the vehicle consequently entering into an unpowered state. Thus, by incorporating the directional speed sensor, the current sensor, and the high voltage direct current contactor into an architecture of a traction system of the vehicle, compliance of the vehicle may be guaranteed even if one or more components of the traction system do not individually comply with certain standards, by ensuring that power supplied to the electric motor is cut off in the event of a change in performance (e.g., degradation) of the one or more non-compliant components. As a result of the system and methods described herein, off-the-shelf components such as inverters and motors may be used in electric traction systems, decreasing a cost of designing and developing the electric traction systems and increasing vehicle reliability. An additional advantage of the systems and methods disclosed herein is that the proposed modifications to an electric traction system are inexpensive and relatively easy to carry out.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

The methods and systems described herein refer to a traction system of an electric vehicle. During operation of the electric vehicle, an electronic control unit (ECU), such as a Vehicle Control Unit (VCU) or a Driveline Control Unit (DCU), may receive input from an operator of the electric vehicle. In response to the input from the operator, the ECU may command various components of the traction system to supply traction to one or more wheels of the vehicle. Functional standards establish that in the event of a change in performance (e.g., a degradation) of a component of the traction system, the vehicle should enter an unpowered state (e.g., where no power is supplied to the one or more wheels). As described herein, in the event that the degraded component is not functionally certified, compliance with the functional standards of the vehicle may still be ensured with via a proposed new architecture of the traction system, and corresponding methods, that ensure that the vehicle enters the unpowered state by cutting off power to an inverter of the vehicle in response to the change in performance (e.g., degradation).

Figure 1:
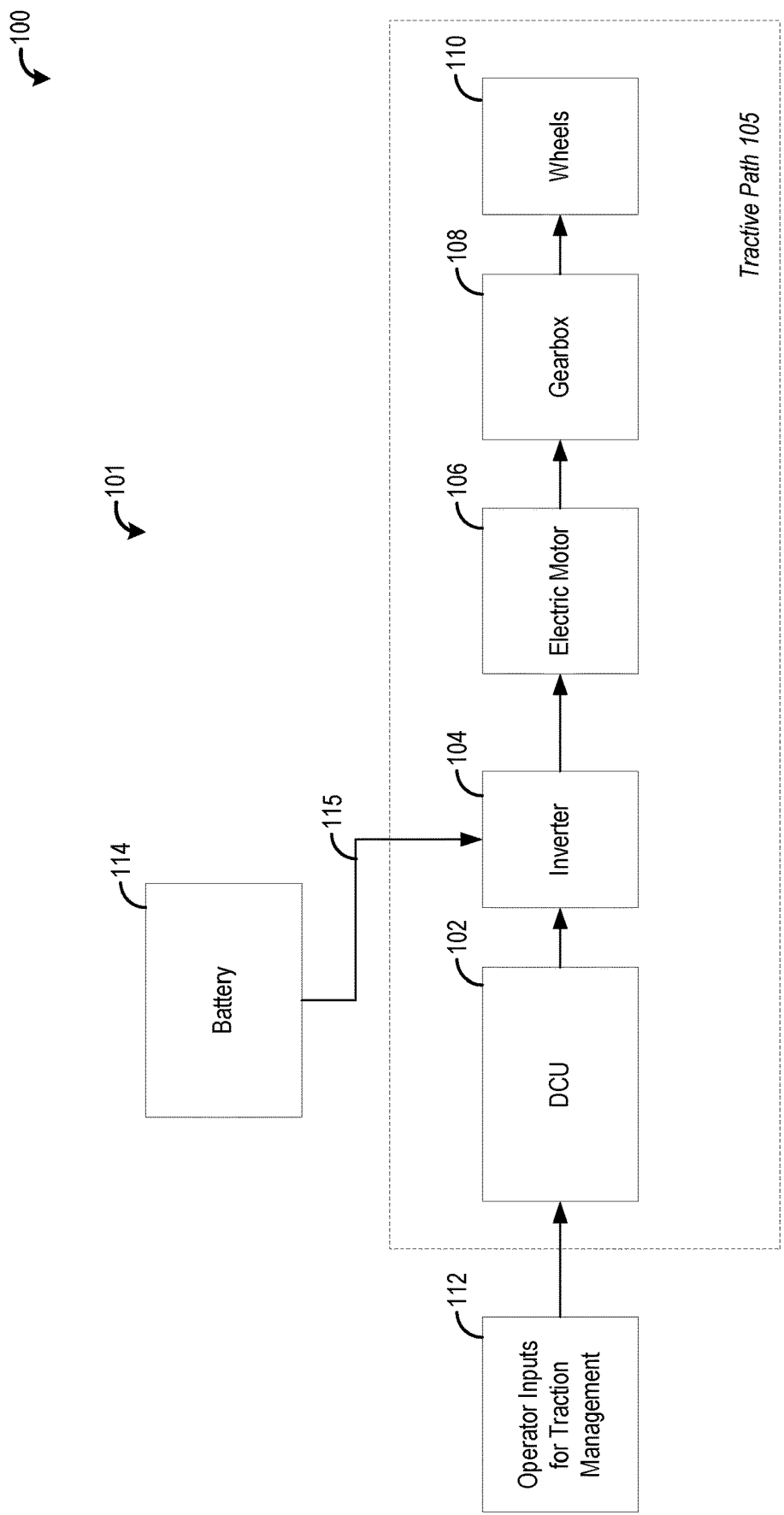
FIG. 1 is a schematic representation of a first exemplary architecture of an electric vehicle, as prior art.
Figure 2:
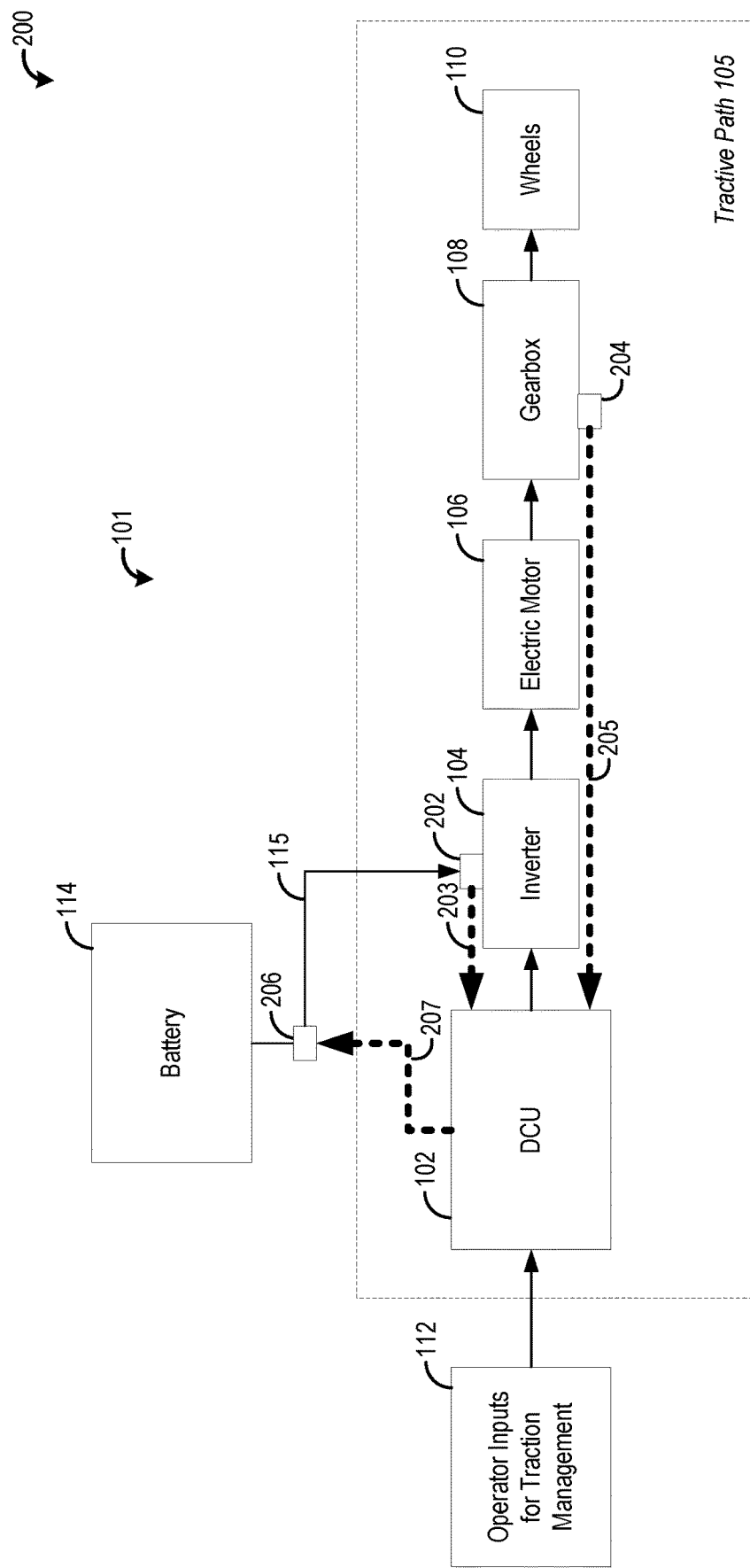
FIG. 2 is a schematic representation of a second exemplary architecture of an electric vehicle, in accordance with one or more embodiments of the present disclosure.

A first exemplary architecture of an electric vehicle that may not be compliant with functional standards is shown in FIG. 1. In contrast, FIG. 2 shows a second exemplary architecture of an electric vehicle that may be compliant with functional standards. Compliance of an electric vehicle with functional standards may be achieved by following one or more steps of an exemplary method of FIG. 3. One or more steps of FIG. 3 may be performed by a controller of the electric vehicle, following a logic depicted in FIGS. 4A and 4B.

Referring now to FIG. 1, select components of a first exemplary architecture 100 of an electrified vehicle 101 are shown, including a DCU 102, an inverter 104, electric motor 106, A gearbox 108, and one or more drive wheels 110. DCU 102, inverter 104, electric motor 106, gearbox 108, and the one or more drive wheels 110 may constitute a tractive path 105 of vehicle 101, where tractive path 105 is a chain of electrically and/or mechanically coupled components that collectively operate to provide traction to propel the vehicle.

The traction may be requested by an operator of vehicle 101 based on one or more operator inputs for traction management 112. The operator inputs 112 may allow an operator to request, for example, a desired direction for the vehicle to move in, a desired speed of the vehicle, and/or a desired torque of the vehicle. To meet an operator demand for a requested direction, speed, and/or torque, a request of the operator received via the operator inputs 112 may be passed to one or more additional ECUs and/or components of the vehicle. The requested torque may be powered by a battery 114, which may supply a high voltage direct current line 115 to inverter 104, which may power electric motor 106.

As an example, a request by an operator for increased traction (e.g., speed) of the vehicle may be received from the operator inputs 112 (e.g., from an accelerator pedal) by a first ECU, such as DCU 102. The first ECU may send a first signal requesting the increased traction to a second ECU of inverter 104 of the vehicle, which may control electric motor 106 via a second signal. Controlling the electric motor 106 may include sending a third signal to a third ECU of gearbox 108 of the vehicle. In response to receiving the third signal, the third ECU of gearbox 108 may actuate one or more gears to increase a tractive effort of the vehicle. Thus, each of the first ECU, the second ECU, and the third ECU may manage the request for traction at a corresponding element along tractive path 105.

Because a degradation in any component of tractive path 105 could compromise vehicle performance, vehicle 101 must comply with various functional standards. In first exemplary architecture 100, for vehicle 101 to comply, individual components of vehicle 101 such as DCU 102, inverter 104, electric motor 106, and gearbox 108 may be individually compliant with respective functional standards corresponding to a component's functioning. If one or more of the individual components (e.g., invertor 104, electric motor 106, etc.) is not compliant, the entire vehicle may not be compliant.

For the purposes of the functional certification, an unpowered state of a vehicle is defined as a state in which no torque is applied to wheels of the vehicle. With a functionally compliant architecture, in the event of a degradation that could compromise vehicle performance (e.g., an unintended acceleration of the vehicle) in one or more components along tractive path 105, an ECU corresponding to a degraded component reacts to the degradation and enters the vehicle into the unpowered state (e.g., no traction). In electric vehicles, some components are already compliant with functional standards because an ECU was previously used to guarantee functional compliance in older, non-electrified transmissions, where propulsion of a vehicle is based on an internal combustion engine that was certified for the traction function. However, components specific to electrified vehicles, in particular, off-the-shelf components including inverters and motors, may not be compliant. If a component such as inverter 104 is not compliant, in the event of a degradation, it may not be possible to react to the degradation in a way that complies with functional standards, because the actuator that can guarantee entrance into the unpowered state is the inverter itself. Since the inverter is not certified, software and hardware of the inverter may not be able to guarantee a recovery from the degradation.

However, since functional compliance is based on the vehicle being able to enter the unpowered state (e.g., no traction), vehicle 101 may be brought into compliance even if inverter 104 is not functionally compliant, if it can be guaranteed that vehicle 101 will enter the unpowered state in the event of a degradation of inverter 104. An alternate architecture that may guarantee that vehicle 101 will enter the unpowered state in the event of a degradation of inverter 104 is shown in FIG. 2.

Referring now to FIG. 2, a second exemplary architecture 200 of vehicle 101 is shown. The second exemplary architecture 200 may be similar to the first exemplary architecture and may include most or all of the same components as the first exemplary architecture, such as the operator inputs 112, DCU 102, inverter 104, electric motor 106, gearbox 108, the one or more drive wheels 110, and battery 114. Additionally, the second exemplary architecture 200 includes a current sensor 202, a directional speed sensor 204, and a direct current high voltage contactor (also referred to herein as the contactor) 206.

Current sensor 202 may be arranged on inverter 104 at a location where inverter 104 receives power from battery 114 via high voltage direct current line 115. Thus, current sensor 202 may detect an amount of current entering inverter 104 from battery 114. The amount of current entering inverter 104 may depend on a request for speed or torque issued by the operator via the operator inputs 112. For example, if the operator requests an increase in a speed of vehicle 101 via an accelerator pedal of the vehicle, DCU 102 may command inverter 104 to increase a speed of electric motor 106. In response to the command to increase the speed of electric motor 106, inverter 104 may draw more power from battery 114. As inverter 104 draws more power from battery 114, current sensor 202 may detect an increase in the current entering inverter via line 115. Thus, an amount of current and/or changes to the amount of current measured at current sensor 202 may be used to estimate an amount of torque commanded by inverter 104 (e.g., in response to an operator request for torque/speed).

In various embodiments, current sensor 202 may be electronically coupled to DCU 102 via a signal line 203, such that an amount of a current sensed by current sensor 202 may be communicated to DCU 102 as the current enters inverter 104. Under conditions where no current is passing through high voltage direct current line 115, an output of current sensor 202 may be an indication to DCU 102 that no current is entering inverter 104. For example, in a first condition, where an operator has requested torque from DCU 102 via operator inputs 112, current sensor 202 may indicate to DCU 102 that a current is being supplied to inverter 104 to generate tractive effort via electric motor 106. In a second condition, where inverter 104 draws either additional or reduced power from battery 114, current sensor 202 may indicate to DCU 102 a change (e.g., an increase or decrease) in the current supplied to inverter 114. As described in greater detail below, the change may be used to estimate a torque commanded by inverter 104, to determine whether the commanded torque is plausible given a corresponding operator request for torque. In a third condition, the current may be cut off (as described below), and current sensor 202 may indicate to DCU 102 that no current is being supplied to inverter 114 (e.g., that vehicle 101 is in a unpowered state with no traction at the one or more wheels 110).

Directional speed sensor 204 may be arranged at gearbox 108, such that directional speed sensor 204 may detect a speed of an output shaft of gearbox 108. In various embodiments, directional speed sensor 204 may be electronically coupled to DCU 102 via a signal line 205, such that a speed of electric motor 106 may be communicated to DCU 102 as requests for speed and/or torque are processed by inverter 104. For example, in response to a request for increased speed by an operator via operator inputs 112, inverter 104 may command electric motor 106 to increase a speed of the motor shaft. In response to detecting an increased speed of the motor shaft, directional speed sensor 204 may send a signal to DCU 102 indicating the speed of the motor shaft.

Contactor 206 may be arranged on high voltage direct current signal line 115 that supplies power to inverter 104 from battery 114. In various embodiments, contactor 206 may be a cutoff relay, where when contactor 206 is in a first, open position, power is allowed to pass through contactor 206 from battery 114 to invertor 104, and when contactor 206 is in a second, closed position, power is not allowed to pass through contactor 206 from battery 114 to invertor 104. Thus, by closing contactor 206, power to electric motor 106 may be cut off, thereby terminating a tractive effort of electric motor 106 and causing vehicle 101 to enter a unpowered state in which no traction is supplied at the one or more wheels 110.

In various embodiments, contactor 206 may be electronically coupled with DCU 102 via a signal line 207, such that DCU 102 may transmit signals to contactor 206 via signal line 207. In other words, DCU 102 may transmit a first signal to contactor 206 to close contactor 206, whereby no traction is generated at the one or more wheels 110, and DCU 102 may subsequently transmit a second signal to contactor 206 to open contactor 206, whereby traction may be generated at the one or more wheels 110, in accordance with a request from an operator via the operator inputs 112.

Current sensor 202, directional speed sensor 204, and contactor 206 may be strategically employed in conjunction to ensure that a compliance of vehicle 101 with functional standards (for example, EN 1175, ISO 25119, ISO 19014, and ISO 13849, among others) is guaranteed, even if components such as inverter 104 and/or electric motor 106 are off-the-shelf components that are not certified to be compliant with the relevant standards. As described in greater detail below in reference to FIG. 3, in the event of a degradation at inverter 104 and/or electric motor 106, electronic communication between DCU 104 and current sensor 202 (via signal line 203), directional speed sensor 204 (via signal line 205), and contactor 206 (via signal line 207) may be advantageously used by DCU 104 to cut off power to inverter 104 and electric motor 106, thereby causing vehicle 101 to enter the unpowered state. Since the degradation may be detected by interpreting signals transmitted over signal line 203 and signal line 205, and since detection may not rely on any signals sent or actions taken by inverter 104, the compliance of vehicle 101 with the standards may be guaranteed by cutting power to electric motor 106, regardless of any action taken or not taken by a non-compliant invertor 104. Therefore, a mitigating action potentially not taken by inverter 104 and/or any lack of a functional compliance guarantee of invertor 104 may not impact the functional certification of vehicle 101.

As an example, an operator of vehicle 101 may request a reduced speed of vehicle 101 via a brake of vehicle 101 (e.g., operator inputs 112). The request for the reduced speed may be received by DCU 102. In response to receiving the request for the reduced speed, DCU 102 may send a first signal to inverter 104 to adjust a speed of electric motor 106. Electric motor 106 may decrease a speed of an output shaft of electric motor 106, and an amount of torque supplied at the one or more wheels 110 of vehicle 101 may be reduced. As inverter 104 adjusts the speed of electric motor 106, current sensor 202 may detect a change in current supplied to inverter 104 by battery 114. The change in current may be transmitted by current sensor 202 to DCU 102 via signal line 203.

However, inverter 104 may be degraded, whereby instead of sending a signal to electric motor 106 to reduce the vehicle speed, inverter 104 may transmit a signal to electric motor 106 to increase the vehicle speed. As a result of sending the signal to increase the vehicle speed to electric motor 106, the speed of the output shaft of electric motor 106 may be increased, and the amount of torque supplied at the one or more wheels 110 may not be reduced, and may be increased, compromising vehicle performance.

When inverter 104 transmits the signal to electric motor 106 to increase the vehicle speed, more power may be drawn from battery 114 into invertor 104 to provide power to electric motor 106 to increase the vehicle speed. As a current entering inverter 104 via line 115 increases, current sensor 202 may output to DCU 102, via signal line 203, an indication of the increase in current. DCU 102 may estimate a torque commanded by inverter 104 based on the indication of the increase in current received from current sensor 202. DCU 102 may then compare the estimated torque with a threshold torque. If DCU 102 determines that the estimated torque commanded by inverter 104 is greater than the threshold torque, DCU 102 may deduce that a degradation exists in inverter 104.

Additionally, when the incorrect signal to increase the vehicle speed is transmitted from inverter 104 to electric motor 106, directional speed sensor 204 may transmit a signal to DCU 102 via signal line 205 indicating a change in a measured speed of electric motor 106 (e.g., the output shaft of electric motor 106). DCU 102 may compare the measured speed of electric motor 106 received via signal line 205 with the request to reduce vehicle speed received from the operator inputs 112. In response to determining that the measured speed of electric motor 106 is not a plausible response to the request to reduce vehicle speed, DC 102 may deduce that a degradation exists in inverter 104.

If DCU 102 deduces that a degradation exists in inverter 104, DCU 102 may send a signal to contactor 206, via signal line 207, to adjust contactor 206 to a closed position. When contactor 206 is adjusted to the closed position, power supplied by battery 114 is cut off from tractive path 105, and no power from the battery is supplied to inverter 104. In response to inverter 104 not receiving any power from battery 114, a speed of electric motor 106 may be reduced to zero. As a result of the speed of the electric motor 106 being reduced to zero, traction supplied at the one or more wheels 110 may be reduced to zero, and vehicle 101 may enter the unpowered state. Concurrently, current sensor 202 may send a signal to DCU 102 indicating no power is being supplied to inverter 104, and that as a result, vehicle 101 has entered a unpowered state whereby no traction is supplied at the one or more wheels 110. Thus, by verifying a plausibility of the speed of electric motor 106 and a plausibility of an estimated torque commanded by inverter 104 given the request to reduce vehicle speed, and in response to detecting a lack of plausibility of the speed of electric motor 106 or the estimated torque based on the request to reduce vehicle speed, the functional compliance of vehicle 101 with relevant standards may be guaranteed by cutting off power to inverter 104.

Figure 3:
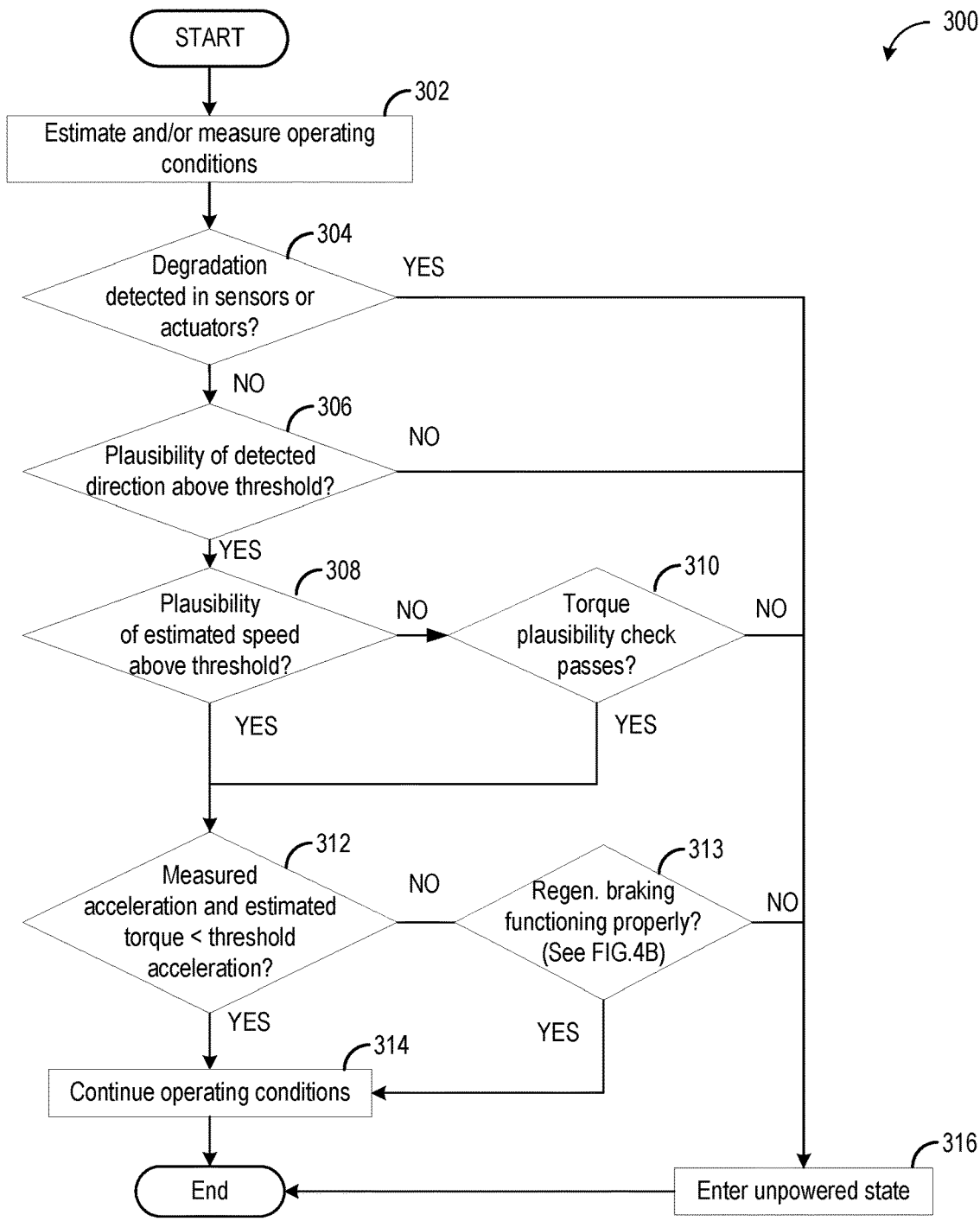
FIG. 3 is a flowchart that illustrates an exemplary method for ensuring compliance of an electric vehicle with functional standards, in accordance with one or more embodiments of the present disclosure.

Referring now to FIG. 3, a flowchart of an exemplary method 300 is shown for ensuring compliance of an electric vehicle (also referred to as the vehicle) with functional standards, even when one or more components of the vehicle may not be individually compliant with functional standards. For example, an inverter of the vehicle may be an off-the-shelf component that may not be certified as functionally compliant, whereby the off-the-shelf inverter may not guarantee the correct performance of the vehicle in the event of a degradation of the off-the-shelf inverter. As described herein, in the event of the degradation, the functional compliance of the vehicle may be guaranteed by following one or more steps of method 300. Method 300 may be carried out by a controller of the vehicle, such as a DCU (e.g., DCU 102 of FIG. 2). The DCU may carry out various operations of the electric vehicle, such as adjusting a transmission ratio of the electric vehicle, adjusting a speed of the motor, and/or adjusting a torque of the motor, which may be carried out concurrently with the operations of method 300 described below.

At 302, method 300 includes estimating and/or measuring vehicle operating conditions. Vehicle operating conditions may be estimated based on one or more outputs of various sensors of the vehicle such as wheel velocity sensors, torque sensors, motor speed sensors, battery state of charge sensors, etc. In particular, the sensors may include a current sensor arranged on a power line coupling a battery of the vehicle with an inverter of the vehicle and a directional speed sensor arranged at a gearbox of the vehicle (e.g., current sensor 202 and directional speed sensor 204 described above in reference to FIG. 2). Estimating and/or measuring vehicle operating conditions may include estimating and/or measuring an electric motor velocity, battery charge, engine torque output, vehicle wheel torque, etc. In some embodiments, estimating and/or measuring vehicle operating conditions may include running one or more diagnostic routines of the vehicle to determine whether a degradation exists in one or more components of the vehicle.

At 304, method 300 includes determining whether a degradation exists in one or more sensors or actuators of the vehicle. For example, a degradation in a current sensor of the vehicle may be detected as a result of a controller of the vehicle executing a diagnostic routine. In some embodiments, the diagnostic routine may be executed regularly or periodically. In other embodiments, the diagnostic routine may be executed as a result of detecting an irregularity at one or more other sensors of the vehicle. If a degradation exists in a sensor or actuator involved in guaranteeing the functional compliance of the vehicle with relevant standards, such as the current sensor of the inverter, the directional speed sensor of the gearbox, and/or a high voltage direct current contactor (e.g., the high voltage direct current contactor 206 of FIG. 2) arranged on a power line coupling the battery with the inverter, vehicle performance may be compromised. If a degradation is detected in the one or more sensors or actuators of the vehicle, method 300 proceeds to 316.

At 316, method 300 includes entering the vehicle into an unpowered state. The unpowered state may be defined by functional standards, such as the standards EN 1175, ISO 25119, ISO 19014, and ISO 13849 mentioned above. In various embodiments, the unpowered state may be defined as a state in which no torque is delivered at one or more wheels of the vehicle. Various alternative procedures may be followed to enter the vehicle into the unpowered state. For example, in the event of a degradation of a component that is certified functionally compliant, the certified component may initiate one or more routines to enter the vehicle into the unpowered state. The one or more routines may include, for example, sending a signal to a controller of the vehicle to stop applying torque at the one or more wheels of the vehicle.

Entering the vehicle into the unpowered state may also be achieved by cutting power to one or more components of the vehicle, such as the inverter. For example, the inverter may draw power from the battery based on a request for torque or speed from an operator of the vehicle. By cutting power to the inverter, for example, by opening the high voltage direct current contactor, the motor may not receive power, and torque to the one or more wheels may no longer be applied.

If at 304 it is determined that no degradations have been detected in the one or more sensors or actuators of the vehicle, method 300 proceeds to 306. At 306, method 300 includes estimating a plausibility of a detected direction of the vehicle being an appropriate response to a requested direction of the vehicle, and then determining whether the plausibility exceeds a threshold plausibility. In various embodiments, the detected direction of the vehicle may be detected by the directional speed sensor arranged at a gearbox of the vehicle.

For example, a driver of the vehicle may indicate a desired direction for the vehicle to move via the one or more operator inputs to the vehicle (e.g., the operator inputs 112 of FIG. 2). In various embodiments, the desired direction may be indicated by a Forward/Neutral/Reverse (FNR) lever. In response to the receiving the desired direction from the operator inputs, a controller of the vehicle (e.g., DCU 102 of FIG. 2) may transmit one or more signals to a gearbox (e.g., gearbox 108 of FIG. 2) of the vehicle to adjust a direction of the vehicle from a first direction of movement to a second direction of movement (e.g., from a forward direction to a reverse direction, or from reverse direction to a forward direction). As the vehicle moves into the second direction, the directional speed sensor may detect and notify the controller that the vehicle is moving in the second direction. The controller may compare the second direction received from the directional speed sensor with the desired direction requested by the driver.

The controller may further estimate a plausibility that the second direction is an adequate response to the requested direction. For example, if the second direction is the same as the requested direction, the second direction may be assigned a higher plausibility, meaning that the second direction is a plausible response to the requested direction (e.g., that the second direction matches the requested direction). On the other hand, if the if the second direction is not the same as the requested direction, the second direction may be assigned a lower plausibility, meaning that the second direction is not a plausible response to the requested direction (e.g., that the second direction does not match the requested direction).

If it is determined at 306 that the plausibility of the second direction being an adequate response to the requested direction does not exceed the threshold plausibility, the controller may conclude that a degradation may have occurred at the gearbox, whereby method 300 proceeds to 316, and the vehicle is entered into the unpowered state. Alternatively, if it is determined at 306 that the plausibility of the second direction being an adequate response to the requested direction exceeds the threshold plausibility, method 300 proceeds to 308.

At 308, method 300 includes estimating a plausibility of a speed of the vehicle being an appropriate response to a requested speed of the vehicle (e.g., from the driver), and then determining whether the plausibility exceeds a threshold plausibility. For example, the driver may initiate a request for increased speed by pressing an accelerator of the vehicle. In various embodiments, the request for increased speed may be based on a position of the accelerator.

As the request for speed is fulfilled, the directional speed sensor may measure a speed of an output shaft of a gearbox of the vehicle. The controller may compare the measured speed of the output shaft received from the directional speed sensor with the speed requested by the driver, to estimate a plausibility that the measured speed is an adequate response to the requested speed. For example, if a difference between the measured speed and the requested speed is within a threshold distance (e.g., 1% deviation), the measured speed may be assigned a higher plausibility, meaning that the measured speed commanded by the inverter is a plausible response to the requested speed (e.g., that the estimated torque matches the requested torque). On the other hand, if the difference between the measured speed and the requested speed exceeds the threshold distance, the measured speed may be assigned a lower plausibility, meaning that the measured speed of the motor shaft is not a plausible response to the requested speed (e.g., that the measured speed does not sufficiently match the requested speed).

If it is determined at 308 that the plausibility of the estimated speed being an adequate response to the requested speed exceeds the threshold plausibility, the controller may conclude that the inverter and gearbox are functioning properly, whereby method 300 proceeds to 312. Alternatively, if it is determined at 308 that the plausibility of the measured speed being an adequate response to the requested speed does not exceed the threshold plausibility, method 300 proceeds to 310.

At 310, method 300 includes conducting a torque plausibility check. In various embodiments conducting the torque plausibility check may include determining whether an estimated torque of the motor is greater than a threshold (e.g., zero). If the estimated torque is greater than the threshold, the torque plausibility check may not pass. Alternatively, if the estimated torque is less than or equal to the threshold, the torque plausibility check may pass.

The estimated torque may depend on a position of the accelerator. For example, if the accelerator is pressed to a position indicating that a 40% increase in torque is requested, the inverter may provide 100 amps of current to the motor. As the request for torque is fulfilled, the current sensor may measure the current supplied to the inverter and send the measured current to the controller. The controller may estimate the amount of torque commanded by the inverter based on the measured current. A power draw of the inverter may be correlated with the amount of torque commanded by the inverter. If the inverter commands the motor to increase the torque by a large amount, the inverter may draw a large amount of power. If the inverter commands the motor to increase the torque by a small amount, the inverter may draw a small amount of power. In various embodiments, the torque may be estimated in accordance with a formula based on the current, a voltage supplied to the inverter, and a number of rotations per minute (RPM) of the motor.

If it is determined at 310 that the torque plausibility check does not pass, the controller may conclude that a degradation may have occurred at the inverter, whereby method 300 proceeds to 316, and the vehicle is entered into the unpowered state. Alternatively, if it is determined at 310 that the torque plausibility check passes, the controller may conclude that the inverter is functioning properly, whereby method 300 proceeds to 312.

At 312, method 300 includes determining whether a calculated acceleration of the vehicle exceeds an threshold acceleration of the vehicle. The acceleration may be calculated as a function of a change in an output of a speed sensor (e.g., the directional speed sensor, or a wheel sensor) over a duration. The threshold acceleration of the vehicle may be a pre-established threshold acceleration based on one or more operating conditions of the vehicle and/or road conditions. For example, a first threshold acceleration may apply when the vehicle is accelerating at a first rate, on a first set of road conditions, a second threshold acceleration may apply when the vehicle is accelerating at a second rate on a second set of road conditions, and so on.

In some embodiments, the threshold acceleration may be determined based on a standard formula, such as a percentage of a maximum acceleration from a stationary position. For example, an threshold acceleration may be reached when an acceleration is calculated to be equivalent to 75% of the maximum acceleration for a given duration (e.g., 0.2 seconds). The threshold acceleration may be based on a probability of a vehicle tip-over occurring. For example, a first threshold acceleration may be applied when the vehicle is accelerating on a straight section of a road, and a second threshold acceleration may be applied when the vehicle is accelerating around a curve of the road. The second threshold acceleration may be lower than the first threshold acceleration, due to an increased probability of the vehicle tipping over.

In various embodiments, the threshold acceleration may be determined from a lookup table stored in a memory of the controller based on factors such as vehicle speed, road conditions, starting acceleration, turn radius, or other factors. In other embodiments, the threshold acceleration may be calculated dynamically via one or more computational algorithms. For example, an artificial intelligence (AI) or machine learning (ML) model may be trained to output an threshold acceleration based on inputs that include outputs of various sensors of the vehicle. In some embodiments, the threshold acceleration may be determined based on one or more regulatory standards. For example, a regulatory standard may specify that certain type of risk analysis should be performed to generate the threshold acceleration.

If it is determined at 312 that the acceleration of the vehicle is not greater than the threshold acceleration, method 300 proceeds to 313. At 313, method 300 includes determining whether the acceleration of the vehicle being greater than the threshold acceleration is acceptable due to a proper functioning of a regenerative braking system of the vehicle (e.g., in the case of a negative acceleration).

The acceleration may be a positive acceleration, or a negative acceleration. The positive acceleration may be requested by the driver via an accelerator pedal of the vehicle, as described above. The negative acceleration may be requested when the driver of the vehicle applies a brake of the vehicle, or when the driver shifts into a lower gear of the vehicle. For example, the negative acceleration may occur when the driver applies the brake of the vehicle in response to a leading vehicle being too close to the vehicle. Further, the request for negative acceleration may be a regenerative torque request, for example, when regenerative braking is applied when the vehicle is being operated on a decline. Thus, when negative acceleration is requested, an effect of regenerative braking may be taken into consideration.

Figure 4A:
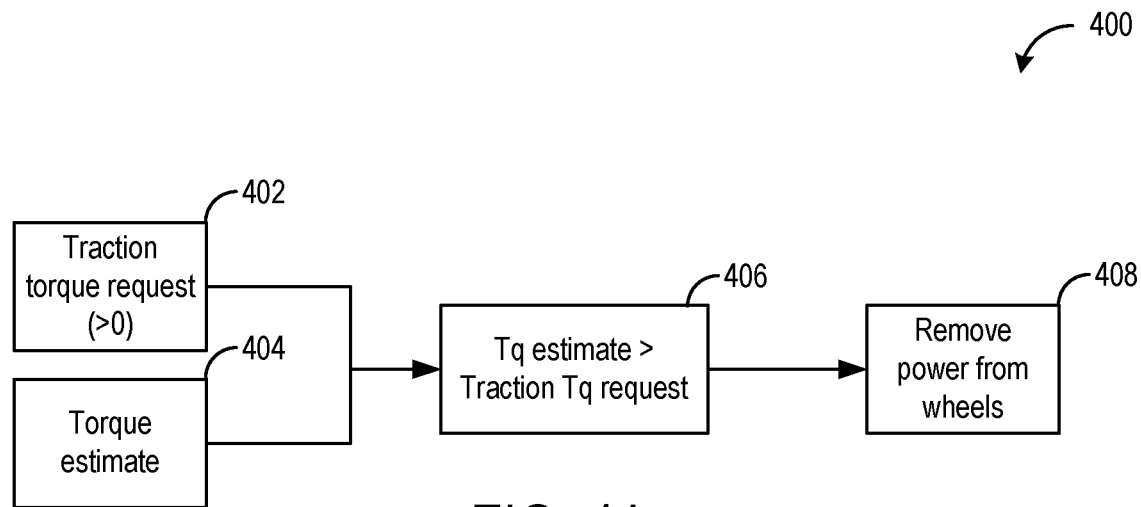
FIG. 4A is a schematic representation of a first control logic of an electric vehicle, in accordance with one or more embodiments of the present disclosure.
Figure 4B:
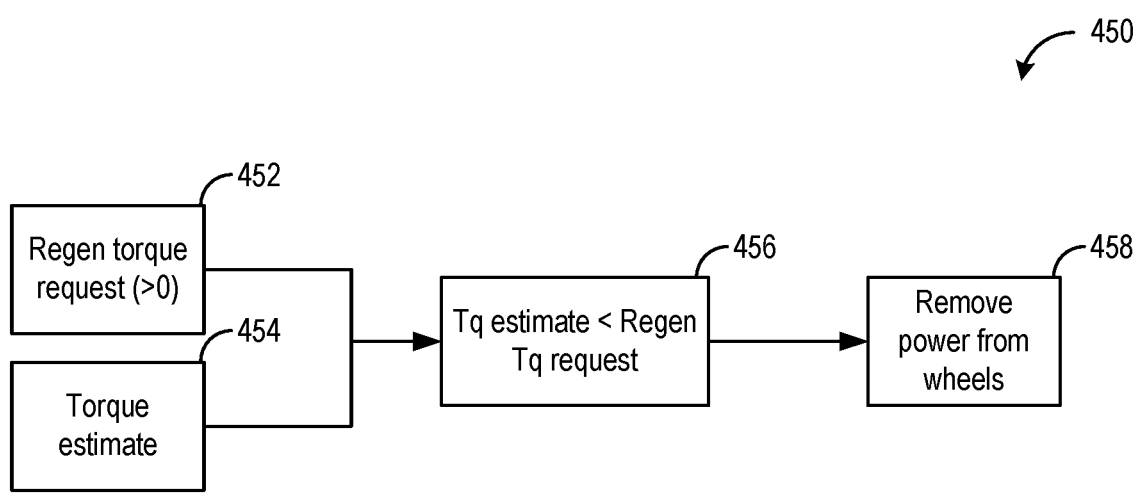
FIG. 4B is a schematic representation of a second control logic of an electric vehicle, in accordance with one or more embodiments of the present disclosure.

Referring briefly to FIGS. 4A and 4B, schematic diagrams are shown depicting exemplary control logic employed by the controller for cases of positive and negative acceleration. In FIG. 4A, a first control logic example 400 shows a traction torque request 402 resulting from a requested positive acceleration, and a corresponding estimated torque 404 generated as a result of the requested positive acceleration. Traction torque request 402 and estimated torque 404 may be compared at a conditional block 406 to determine whether the estimated torque 404 is greater than the traction torque request 402. If estimated torque 404 is greater than the traction torque request 402, the vehicle may be entered into the unpowered state where power is removed from the wheels of the vehicle, as shown in action block 408. The control logic of FIG. 4A may be applied, for example, at step 308 of method 300 described above, during a torque request plausibility check.

Alternatively, in FIG. 4B, a second control logic example 450 shows a regenerative torque request 452 resulting from a requested negative acceleration, and a corresponding estimated torque 454 generated as a result of the requested negative acceleration. As described above, the negative acceleration may be requested by a regenerative braking system of the vehicle, for example, in response to the vehicle accelerating down a decline. If a positive acceleration of the vehicle increases above a threshold acceleration, regenerative torque request 452 may be requested by the regenerative braking system to reduce a speed of the vehicle, and to recover energy generated by the change in speed for later use. Regenerative torque request 452 and estimated torque 454 may be compared at a conditional block 456 to determine whether the estimated torque 454 is less than the regenerative torque request 452. If estimated torque 404 is less than the regenerative torque request 452, it may be deduced that a degradation exists in the regenerative braking system, and the vehicle may be entered into the unpowered state where power is removed from the wheels of the vehicle. If estimated torque 404 is not less than the regenerative torque request 452, it may be deduced that the regenerative braking system is functioning correctly, and the vehicle may not be entered into the unpowered state where power is removed from the wheels of the vehicle.

Returning to FIG. 3, if it is determined at 313 that the regenerative braking system is not functioning properly, method 300 proceeds to 316, and the vehicle may be entered into the unpowered state. If it is determined at 313 that the regenerative braking system is functioning properly, method 300 proceeds to 314. At 314, operating conditions of the vehicle are continued, and method 300 may end.

Thus, systems and methods are provided for ensuring functional compliance of an electric vehicle even when one or more components of the electric vehicle are not compliant with functional standards. As described herein, one or more plausibility checks may be performed to compare an operator input and a corresponding response of the vehicle. The one or more plausibility checks may include a plausibility check between a requested direction of movement and a direction of movement detected by the directional speed sensor; a plausibility check between a requested speed and a a speed measured by the directional speed sensor; a plausibility check between an estimated torque and a torque threshold; and a plausibility check between a requested acceleration and a pre-determined threshold (e.g., maximum) acceleration. If a discrepancy between the operator input and the corresponding response of the vehicle is detected as a result of the plausibility checks, the vehicle may be entered into a unpowered state by activating a high voltage direct current contactor that cuts off power to an inverter of the vehicle.

In this way, by incorporating the directional speed sensor, the current sensor, and the high voltage direct current contactor into an architecture of a traction system of the vehicle, functional compliance of the vehicle may be guaranteed even if one or more components of the traction system do not individually comply with standards. As a result, off-the-shelf components such as inverters and motors may be used in electric traction systems, decreasing a cost of the electric traction systems. An advantage of the systems and methods disclosed herein is that the proposed modifications to an electric traction system are inexpensive and relatively easy to carry out.

The technical effect of carrying out plausibility checks to determine whether a response of a vehicle is consistent with a requested speed, torque, acceleration, or direction of movement of the vehicle, and activating a high voltage direct current contactor in response to one or more of the plausibility checks not passing, is that the vehicle is entered into a unpowered state where no power is delivered at wheels of the vehicle in the event of a degradation of a component of the vehicle, thereby meeting functional standards of the vehicle.

The disclosure also provides support for a system for an electric vehicle, comprising: a current sensor arranged on a power line coupling a battery of the electric vehicle with an inverter of the electric vehicle, a directional speed sensor arranged at a gearbox of the electric vehicle, and a high voltage direct current contactor arranged on the power line coupling the battery of the electric vehicle with the inverter, upstream of the current sensor, the high voltage direct current contactor configured to allow a current to flow from the battery to the inverter when the high voltage direct current contactor is in a closed position, and to not allow the current to flow when the high voltage direct current contactor is in an open position. In a first example of the system, the system further comprises: an Electronic Control Unit (ECU), storing instructions in non-transitory memory that, when executed, cause the ECU to: adjust a transmission ratio of the electric vehicle, adjust a speed of a motor of the electric vehicle, and/or adjust a torque of the motor in response to one or more operator inputs. In a second example of the system, optionally including the first example, the ECU is a Driveline Control Unit (DCU). In a third example of the system, optionally including one or both of the first and second examples, further instructions are stored in non-transitory memory that, when executed, cause the ECU to: detect a direction of movement of the electric vehicle, the detected direction detected via the directional speed sensor, compare a desired direction of movement of the electric vehicle requested by a driver of the electric vehicle with the detected direction of the electric vehicle, determine a plausibility of the detected direction being an adequate response to the requested direction, in response to the plausibility not exceeding a threshold plausibility, cutting off torque supplied at one or more wheels of the electric vehicle. In a fourth example of the system, optionally including one or more or each of the first through third examples, further instructions are stored in the non-transitory memory that, when executed, cause the ECU to: measure a speed of an output shaft of the gearbox via the directional speed sensor, compare a speed requested by a driver of the vehicle with the measured speed of the output shaft to determine a plausibility of the measured speed being an adequate response to the requested speed, in response to the plausibility exceeding a threshold plausibility, maintain operating conditions of the electric vehicle, in response to the plausibility not exceeding a threshold plausibility: estimate the torque of the motor, in response to the torque being less than or equal to zero, maintain operating conditions of the electric vehicle, and in response to the torque being greater than zero, cutting off torque supplied at one or more wheels of the electric vehicle. In a fifth example of the system, optionally including one or more or each of the first through fourth examples, the torque is estimated based on at least one of: an amount of current drawn by the inverter from the battery, measured by the current sensor, a voltage received from the ECU of the electric vehicle, and the speed of the output shaft of the gearbox measured via the directional speed sensor. In a sixth example of the system, optionally including one or more or each of the first through fifth examples, the ECU monitors a state of charge, a state of health, and a voltage of the battery. In a seventh example of the system, optionally including one or more or each of the first through sixth examples, further instructions are stored in the non-transitory memory that, when executed, cause the ECU to: estimate the torque of the motor, based on an amount of current drawn by the inverter from the battery, estimate an acceleration of the electric vehicle based on the estimated torque and the measured speed of the output shaft of the gearbox, compare the acceleration of the electric vehicle with a threshold acceleration of the electric vehicle, in response to the measured acceleration not exceeding the threshold acceleration, maintain operating conditions of the electric vehicle, and in response to the measured acceleration exceeding the threshold acceleration, cutting off torque supplied at one or more wheels of the electric vehicle. In a eighth example of the system, optionally including one or more or each of the first through seventh examples, the threshold acceleration is calculated based one or more operating conditions and/or road conditions of the electric vehicle. In a ninth example of the system, optionally including one or more or each of the first through eighth examples, the threshold acceleration is calculated by: measuring the one or more operating conditions and/or road conditions of the electric vehicle via one or more sensors of the electric vehicle, and one of: inputting the one or more operating conditions and/or road conditions into a lookup table to obtain the threshold acceleration as an output of the lookup table, and inputting the one or more operating conditions and/or road conditions into a machine learning algorithm that generates the threshold acceleration as an output. The disclosure also provides support for a method for an electric vehicle, comprising: in a first condition, monitoring each of: a current requested by an inverter of the electric vehicle, a speed of an output shaft of a gearbox of the electric vehicle, a difference between a detected direction of the electric vehicle and a desired direction of the electric vehicle requested by a driver of the electric vehicle, and an acceleration of the electric vehicle, and in response to at least one of the current exceeding a threshold current, the speed of the output shaft exceeding a threshold speed, the difference exceeding a threshold difference, and the acceleration exceeding a threshold acceleration, cutting off the current requested by the inverter, and in a second condition, in response to the current not exceeding the threshold current, the speed of the output shaft not exceeding the threshold speed, the difference not exceeding the threshold difference, and the acceleration not exceeding the threshold acceleration, not cutting off the current requested by the inverter. In a first example of the method, the current requested by the inverter is measured by a current sensor arranged between a battery of the electric vehicle and the inverter, the speed of the output shaft and the detected direction of the vehicle is measured by a directional speed sensor arranged at the output shaft, and the acceleration of the vehicle is based on a speed measured by the directional speed sensor and a torque estimated based on an output of the current sensor. The disclosure also provides support for a system of a vehicle, comprising a controller, storing instructions in non-transitory memory that, when executed, cause the controller to: conduct a direction of movement plausibility check between a direction of movement requested by a driver of the vehicle and a direction of movement detected by a directional speed sensor coupled to an output shaft of a gearbox of the vehicle, conduct a speed plausibility check between a speed requested by the driver of the vehicle and a speed measured by the directional speed sensor, conduct an acceleration threshold plausibility check of an acceleration of the vehicle, the acceleration estimated based on an output of the directional speed sensor and an estimated torque, and cut off torque to wheels of the vehicle by actuating a high voltage direct current contactor coupled to a battery of the vehicle to an open position to cut off power to an inverter of the vehicle in response to at least one of the direction of movement plausibility check, the speed plausibility check, and the acceleration threshold plausibility check not passing. In a first example of the system, conducting the speed plausibility check further includes: in response to a difference between the requested speed and the measured speed being less than a threshold difference, assigning a higher plausibility to the measured speed being an appropriate response to the requested speed, in response to the difference between the requested speed and the measured speed being greater than a threshold difference, assigning a lower plausibility to the measured speed being an appropriate response to the requested speed, and indicating that the speed plausibility check passes if the plausibility is greater than a threshold plausibility. In a second example of the system, optionally including the first example, conducting the speed plausibility check further includes: in response to the speed plausibility check not passing: conducting a torque plausibility check, in response to the torque plausibility check not passing, indicating that the speed plausibility check does not pass, and in response to the torque plausibility check passing, indicating that the speed plausibility check passes. In a third example of the system, optionally including one or both of the first and second examples, conducting the torque plausibility check further includes: estimating a torque of a motor of the vehicle, in response to the estimated torque being greater than zero, indicating that the torque plausibility check does not pass, and in response to the estimated torque being less than or equal to zero, indicating that the torque plausibility check passes. In a fourth example of the system, optionally including one or more or each of the first through third examples, the torque is estimated based on at least one of: an amount of current drawn by the inverter from the battery, measured by the current sensor, a voltage received from an electronic control unit (ECU) of the vehicle, and a speed of the output shaft of the gearbox of the vehicle measured via the directional speed sensor. In a fifth example of the system, optionally including one or more or each of the first through fourth examples, conducting the acceleration threshold plausibility check further includes: in response to the acceleration exceeding a threshold acceleration, indicating that the acceleration threshold plausibility check does not pass, and in response to the acceleration not exceeding a threshold acceleration, indicating that the acceleration threshold plausibility check passes. In a sixth example of the system, optionally including one or more or each of the first through fifth examples, the threshold acceleration is one of: an output of a lookup table, based on one or more operating conditions and/or road conditions inputted into the lookup table, and an output of a machine learning algorithm, based on one or more operating conditions and/or road conditions inputted into the machine learning algorithm. In a seventh example of the system, optionally including one or more or each of the first through sixth examples, conducting the direction of movement plausibility check further includes: in response to a difference between the requested direction of movement and the detected direction of movement being less than a threshold difference, assigning a higher plausibility to the detected direction of movement being an appropriate response to the requested direction of movement, in response to the difference between the requested direction of movement and the detected direction of movement being greater than a threshold difference, assigning a lower plausibility to the detected direction of movement being an appropriate response to the requested direction of movement, and indicating that the direction of movement plausibility check passes if the plausibility is greater than a threshold plausibility.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A system for an electric vehicle, comprising:
a current sensor arranged on a power line coupling a battery of the electric vehicle with an inverter of the electric vehicle;
a directional speed sensor arranged at a gearbox of the electric vehicle, wherein the directional speed sensor is configured to indicate a speed of the electric vehicle, a first direction and a second direction, the first direction being a forward direction and the second direction being a reverse direction;
a high voltage direct current contactor arranged on the power line coupling the battery of the electric vehicle with the inverter, upstream of the current sensor, the high voltage direct current contactor configured to allow a current to flow from the battery to the inverter when the high voltage direct current contactor is in a closed position, and to not allow the current to flow when the high voltage direct current contactor is in an open position; and
an Electronic Control Unit (ECU), storing instructions in non-transitory memory that, when executed, cause the ECU to:
adjust a transmission ratio of the electric vehicle, adjust a speed of a motor of the electric vehicle, and/or adjust a torque of the motor in response to one or more operator inputs;
measure a speed of an output shaft of the gearbox via the directional speed sensor;

compare a speed requested by a driver of the vehicle with the measured speed of the output shaft to determine a plausibility of the measured speed being an adequate response to the requested speed;

in response to the plausibility exceeding a threshold plausibility, maintain operating conditions of the electric vehicle; and in response to the plausibility not exceeding the threshold plausibility and indicating the measured speed is an inadequate response to the requested speed:
estimate the torque of the motor;
in response to the torque being less than or equal to zero, determine proper functioning of the inverter and maintain operating conditions of the electric vehicle; and
in response to the torque being greater than zero, determine degradation at the inverter and cut off torque supplied at one or more wheels of the electric vehicle.

2. The system of claim 1, wherein the ECU is a Driveline Control Unit (DCU), and wherein the inverter is not certified.

3. The system of claim 1, wherein further instructions are stored in non-transitory memory that, when executed, cause the ECU to:
detect a direction of movement of the electric vehicle, the detected direction detected via the directional speed sensor;
compare a desired direction of movement of the electric vehicle requested by a driver of the electric vehicle with the detected direction of the electric vehicle, wherein the desired direction moves from the first direction to the second direction;
determine a plausibility of the detected direction being an adequate response to the requested direction; and
in response to the plausibility not exceeding a threshold plausibility, cutting off torque supplied at one or more wheels of the electric vehicle.

4. The system of claim 1, wherein the torque is estimated based on at least one of:
an amount of current drawn by the inverter from the battery, measured by the current sensor;
a voltage received from the ECU of the electric vehicle; and
the speed of the output shaft of the gearbox measured via the directional speed sensor.

5. The system of claim 4, wherein the ECU monitors a state of charge, a state of health, and a voltage of the battery.

6. The system of claim 4, where further instructions are stored in the non-transitory memory that, when executed, cause the ECU to:
estimate the torque of the motor, based on an amount of current drawn by the inverter from the battery;
estimate an acceleration of the electric vehicle based on the estimated torque and the measured speed of the output shaft of the gearbox;
compare the acceleration of the electric vehicle with a threshold acceleration of the electric vehicle;
in response to the measured acceleration not exceeding the threshold acceleration, maintain operating conditions of the electric vehicle; and
in response to the measured acceleration exceeding the threshold acceleration, cutting off torque supplied at one or more wheels of the electric vehicle.

7. The system of claim 6, wherein the threshold acceleration is calculated based one or more operating conditions and/or road conditions of the electric vehicle.

8. The system of claim 7, wherein the threshold acceleration is calculated by:
measuring the one or more operating conditions and/or road conditions of the electric vehicle via one or more sensors of the electric vehicle; and one of:
inputting the one or more operating conditions and/or road conditions into a lookup table to obtain the threshold acceleration as an output of the lookup table; and
inputting the one or more operating conditions and/or road conditions into a machine learning algorithm that generates the threshold acceleration as an output.

9. A method for an electric vehicle, comprising:
in a first condition, monitoring each of:
a current requested by an inverter of the electric vehicle;
a speed of an output shaft of a gearbox of the electric vehicle and a direction of the output shaft indicating a detected direction of the electric vehicle;
a difference between the detected direction of the electric vehicle and a desired direction of the electric vehicle requested by a driver of the electric vehicle, wherein the desired direction of the electric vehicle moves from a first direction to a second direction of the vehicle, and wherein the first direction is a forward direction and the second direction is a reverse direction; and
an acceleration of the electric vehicle;
in response to at least one of the current exceeding a threshold current, the speed of the output shaft exceeding a threshold speed, the difference exceeding a threshold difference, and the acceleration exceeding a threshold acceleration, cutting off the current requested by the inverter;
in a second condition,
in response to the current not exceeding the threshold current, the speed of the output shaft not exceeding the threshold speed, the difference not exceeding the threshold difference, and the acceleration not exceeding the threshold acceleration, not cutting off the current requested by the inverter; and
in a third condition,
compare a speed requested by a driver of the vehicle with the speed of the output shaft to determine a plausibility of the speed being an adequate response to the requested speed;
in response to the plausibility exceeding a threshold plausibility, maintain operating conditions of the electric vehicle; and
in response to the plausibility not exceeding the threshold plausibility and indicating the speed is an inadequate response to the requested speed:
estimate a torque of a motor of the electric vehicle;
in response to the torque being less than or equal to zero, determine proper functioning of the inverter and maintain operating conditions of the electric vehicle; and
in response to the torque being greater than zero, determine degradation of the inverter and cutting off torque supplied at one or more wheels of the electric vehicle.

10. The method of claim 9, wherein:
the current requested by the inverter is measured by a current sensor arranged between a battery of the electric vehicle and the inverter;

the speed of the output shaft and the detected direction of the vehicle is measured by a directional speed sensor arranged at the output shaft; and the acceleration of the vehicle is based on a speed measured by the directional speed sensor and a torque estimated based on an output of the current sensor.

11. A system of a vehicle, comprising a controller, storing instructions in non-transitory memory that, when executed, cause the controller to:

conduct a direction of movement plausibility check between a direction of movement requested by a driver of the vehicle and a direction of movement detected by a directional speed sensor coupled to an output shaft of a gearbox of the vehicle, wherein the direction of movement includes a first direction and a second direction, the first direction being forward and the second direction being reverse, and the directional speed sensor configured to indicate both forward and reverse directions;

conduct a speed plausibility check between a speed requested by the driver of the vehicle and a speed measured by the directional speed sensor;

conduct an acceleration threshold plausibility check of an acceleration of the vehicle, the acceleration estimated based on an output of the directional speed sensor and an estimated torque; and cut off torque to wheels of the vehicle by actuating a high voltage direct current contactor coupled to a battery of the vehicle to an open position to cut off power to an inverter of the vehicle in response to at least one of the direction of movement plausibility check, the speed plausibility check, and the acceleration threshold plausibility check not passing, wherein conducting the speed plausibility check further includes:

in response to a difference between the requested speed and the measured speed being less than a threshold difference, assigning a higher plausibility to the measured speed being an appropriate response to the requested speed;

in response to the difference between the requested speed and the measured speed being greater than a threshold difference, assigning a lower plausibility to the measured speed being an appropriate response to the requested speed; and indicating that the speed plausibility check passes if the plausibility is greater than a threshold plausibility; and wherein conducting the speed plausibility check further includes:

in response to the speed plausibility check not passing:

conducting a torque plausibility check;

in response to the torque plausibility check not passing, determining degradation at the inverter and indicating that the speed plausibility check does not pass; and in response to the torque plausibility check passing, determining the inverter is functioning properly and indicating that the speed plausibility check passes.

12. The system of claim 11, wherein conducting the torque plausibility check further includes:

estimating a torque of a motor of the vehicle;

in response to the estimated torque being greater than zero, indicating that the torque plausibility check does not pass; and in response to the estimated torque being less than or equal to zero, indicating that the torque plausibility check passes.

13. The system of claim 12, wherein the torque is estimated based on at least one of:

an amount of current drawn by the inverter from the battery, measured by a current sensor;

a voltage received from an electronic control unit (ECU) of the vehicle; and a speed of the output shaft of the gearbox of the vehicle measured via the directional speed sensor.

14. The system of claim 11, wherein conducting the acceleration threshold plausibility check further includes:

in response to the acceleration exceeding a threshold acceleration, indicating that the acceleration threshold plausibility check does not pass; and in response to the acceleration not exceeding a threshold acceleration, indicating that the acceleration threshold plausibility check passes.

15. The system of claim 11, wherein the threshold acceleration is one of:

an output of a lookup table, based on one or more operating conditions and/or road conditions inputted into the lookup table; and an output of a machine learning algorithm, based on one or more operating conditions and/or road conditions inputted into the machine learning algorithm.

16. The system of claim 11, wherein conducting the direction of movement plausibility check further includes:

in response to a difference between the requested direction of movement and the detected direction of movement being less than a threshold difference, assigning a higher plausibility to the detected direction of movement being an appropriate response to the requested direction of movement;

in response to the difference between the requested direction of movement and the detected direction of movement being greater than a threshold difference, assigning a lower plausibility to the detected direction of movement being an appropriate response to the requested direction of movement; and indicating that the direction of movement plausibility check passes if the plausibility is greater than a threshold plausibility.

\* \* \* \* \*